July 25, 1967  C. D. BOCK ET AL  3,332,290
ACCELEROMETER
Filed May 22, 1956  2 Sheets-Sheet 1

INVENTORS.
CHARLES D. BOCK
PAUL S. JORGENSEN
JOSEPH STATSINGER
BY
Raymond A. Paquin
ATTORNEY.

July 25, 1967 C. D. BOCK ET AL 3,332,290
ACCELEROMETER
Filed May 22, 1956 2 Sheets-Sheet 2

INVENTORS.
CHARLES D. BOCK
PAUL S. JORGENSEN
JOSEPH STATSINGER
BY
Raymond A. Paquin
ATTORNEY.

United States Patent Office 3,332,290
Patented July 25, 1967

3,332,290
ACCELEROMETER
Charles D. Bock, Floral Park, N.Y., Paul S. Jorgensen, Westbury, N.J., and Joseph Statsinger, Bayside, N.Y., assignors to American Bosch Arma Corporation, a corporation of New York
Filed May 22, 1956, Ser. No. 586,615
7 Claims. (Cl. 73—503)

The present invention relates to accelerometers and has particular reference to integrating accelerometers.

Integrating accelerometers are used to obtain high accuracy of velocity measurement. Present day applications of navigational instruments in high speed vehicles and missiles demand extreme accuracy, wide operating range and utmost reliability of its acceleration sensing devices. The present invention is a new type of accelerometer employing vibrating members as the sensing means and possessing these operating characteristics.

In accordance with this invention, a pair of wires or tapes capable of sustained vibration in at least one plane are attached to a suspended weight, and the wires or tapes are stretched between rigid supports to place them under tension. The weight is supported laterally by centering members symmetrically placed at right angles to the stretched wires or tapes. Permanent magnets provide magnetic fields whereby the wires or tapes are caused to vibrate in planes normal to each other upon passage of alternating current through these wires. In addition, the E.M.F. produced in the wires or tapes as a result of the vibration is effective in keeping the wires vibrating. An acceleration of the supports in the direction of the stretched wires will cause the suspended weight to increase the tension in one wire and reduce the tension in the other thereby providing means for determining the value of the vehicle acceleration from the resulting vibrating frequency difference.

It will be seen that means must be provided for preventing cross coupling between the wires through the sensing mass. In the preferred embodiment the wires are decoupled by providing separate sensitive masses or weights which are joined by a member having a natural frequency much higher than either of the sensing wires. When tapes are used, the inherent stiffness in the plane normal to the plane of vibration is effective in preventing coupling between the tapes.

Since the frequency of wire vibration is proportional to the square root of the tension instead of being a linear function of the tension, the frequency difference is only approximately proportional to acceleration. However, the sum frequency which is similarly dependent on the square root of the tension provides a means for linearizing the frequency difference output and thereby determining the velocity of the supports without approximation.

For a more complete understanding of the invention, reference may be had to the accompanying diagrams in which.

Figure 1:
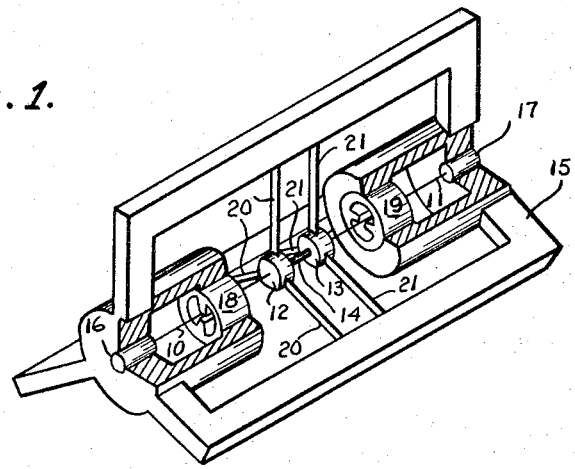
FIG. 1 is a pictorial representation of the sensing element.

Referring now to FIG. 1 which shows a preferred embodiment of the sensing element of the accelerometer, the electrically conducting wires 10 and 11 are connected to the equal and similar weights 12 and 13 respectively which are joined by the wire 14 and the entire assembly 10, 12, 14, 13 and 11 is connected between the rigid supports of a frame 15 so that the wires 10, 11 are put under tension. The ends of the wires 10 and 11 are electrically insulated from each other and from frame 15 by the insulators 16 and 17. If the frame is made of a non-conductor, the insulators 16 and 17 are not required. Any suitable clamping means may be employed, but it should be such as to allow initial adjustment in the tension of the wires 10 and 11.

A permanent magnet 18 produces a transverse magnetic field across wire 10 and has its pole pieces oriented so that the magnetic field is in the vertical plane in FIG. 1, while a similar magnet 19, has its pole pieces positioned and oriented so as to produce a transverse magnetic field across wire 11 in the horizontal plane in FIG. 1. Passage of alternating current through the wires 10 and 11 will, therefore, cause wire 10 to vibrate in a horizontal plane and wire 11 to vibrate in a vertical plane.

The weight 12 is suspended in the frame 15 by the symmetrically placed tapes 20 which are arranged so as to allow motion of the weight 12 in the direction of the axis of wires 10 and 11. Similarly, weight 13 is suspended in frame 15 by the tapes 21.

Figure 2:
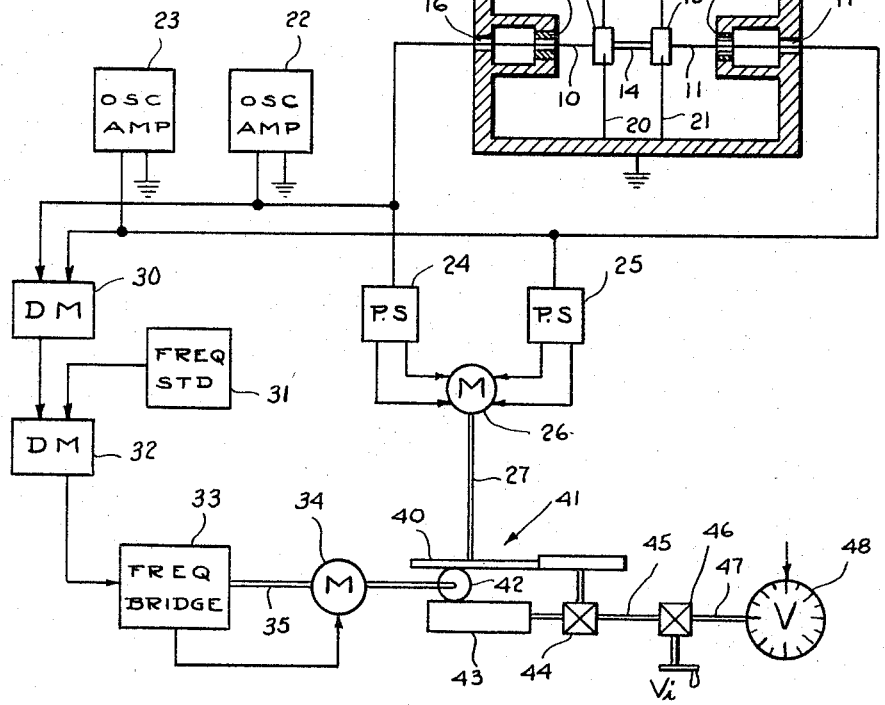
FIG. 2 is a schematic diagram of the electrical and mechanical connections of the sensing element and associated computer.

The wires 10 and 11 are vibrated at their natural frequency by employing two oscillator amplifiers 22, 23, FIG. 2, each having one of the wires 10 or 11 as the load and as the controlling element in the oscillator circuit. Frequency standards employing vibrating wire oscillators of this type are not new and need not be further described here, except to point out that the natural frequency of vibration, $f_n$, depends on the physical constants of the vibrating member and is proportional to $$\sqrt{\frac{T}{ml}}$$

where $T$ is the tension of the wire, $l$ is its length, and $m$ is the mass per unit length. Under zero acceleration, the wires 10, 11 are identical and are exposed to identical conditions, so that the natural frequency of vibration is the same for each wire and is preferably about 5000 c.p.s. When the frame 15 is subjected to an acceleration in the direction of wires 10, 11, to the left in FIG. 1 for example, the tension in one wire 10 increases and in the other wire 11, decreases. This change in tension creates a change in the natural frequency of vibration according to the relationship $$f_{10} = \sqrt{f_n^2 + ka} \quad (1)$$

$$f_{11} = \sqrt{f_n^2 - ka} \quad (2)$$

where:

$f_{10}$ = vibration frequency of wire 10 under an acceleration $a$ $f_{11}$ = vibration frequency of wire 11 under an acceleration $a$ $f_n$ = natural frequency of vibration of both wires 10 and 11 (under zero acceleration)

$k$ is a scaling factor $a$ is the acceleration along the sensitive axis

It appears that the difference frequency, $$f_d = f_{10} - f_{11} = \sqrt{f_n^2 + ka} - \sqrt{f_n^2 - ka} \quad (3)$$

can be used to determine the acceleration proportional to $ka$, but this cannot be done readily. Considering the binominal expansion of (3)

$$f_d = \frac{ka}{f_n}\left[1 + \frac{1}{8}\left(\frac{ka}{f_n}\right)^2 + \cdots\right] \quad (4)$$

it will be seen that the non-linear term resulting from the square root relationship will make the difference frequency difficult to interpret in terms of acceleration. Also, the scaling factor $f_n$ is dependent upon the natural frequency of vibration of the wires.

The present invention employs the sum frequency $$f_s = \sqrt{f_n^2 + ka} + \sqrt{f_n^2 - ka} \tag{5}$$

to provide a change in scaling and to linearize the difference output in the following manner. If the frequency difference $(f_s - f_r)$ between a reference frequency equal to $f_r$ and the sum frequency $f_s$ is multiplied by the value $Kf_d$, where K is a constant of proportionability, the resulting value, $f_b$, is:

$$f_b = Kf_d(f_s - f_r) \tag{6}$$

The values $f_d$ and $f_b$ are then added to provide an output $f_0 = f_d + f_b$ which by addition of $f_d$ to Equation 6 is seen to be $$f_0 = f_d + f_d K(f_s - f_r) \tag{7}$$

If K is made equal to $1/f_r$ then $$f_0 = f_d + f_d 1/f_r(f_s - f_r) \tag{8}$$

$$f_0 = f_d + \frac{f_d f_s}{f_r} - f_d$$

$$f_0 = \frac{f_d f_s}{f_r} \tag{9}$$

substitution of (3) and (5) into (9) yields $$f_0 = \frac{2ka}{f_r} \tag{10}$$

Inspection of Equation 10 shows that the output $f_0$ is linear in $ka$, has a scaling factor $f_r$ which is a constant value independent of the wires, and which can be maintained to a high degree of accuracy.

A preferred instrumentation of the above is shown schematically in FIG. 2. The voltage outputs of the amplifier-oscillators 22 and 23 are applied to the phase splitting networks 24, 25 respectively both of which produce a pair of output voltages each being proportional in magnitude and frequency to the input voltage but differing in phase by 90° from each other. The outputs of one such phase splitting network 24 are applied to the stator windings of a synchronous motor 26, and the outputs of the other phase splitting network 25 are applied to the rotor windings of the synchronous motor. The speed at which the rotor of such a synchronous motor turns is given by the equation $$f_m = \frac{2f_d}{n}$$

where $n$ is the number of poles on the motor.

The synchronous motor 26 is a special type of motor having a two-phase stator winding and a two-phase rotor winding where the two stator windings are displaced by 90 electrical degrees and the two rotor windings are also displaced by 90 electrical degrees. The rotor and stator windings both have the same number of poles. The speed at which the motor turns its output shaft 27 is proportional to the frequency difference between the frequencies of the exciting voltages and the direction of rotation depends on which of the frequencies is higher. It should be pointed out here that the motor 26 must be designed so that it will never fall out of synchronism nor skip one cycle. Phase-splitting networks are well known in the art and may be simply capacitors for example or may equally well comprise networks containing additional components.

Figure 3:
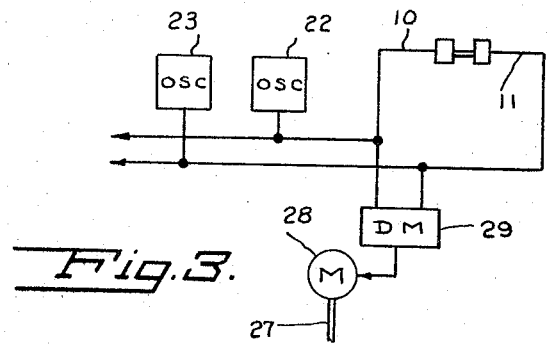
FIG. 3 is an alternative arrangement for a portion of FIG. 2.

An alternate method of obtaining the same result is shown in FIG. 3 where the shaft 27 is driven by a synchronous motor 28 which is energized by the voltage of difference frequency, $f_d$, obtained from the output of the frequency discriminator 29 having inputs of $f_{10}$ and $f_{11}$. Motor 28 has a permanent magnet rotor and a single phase stator winding which is energized by a constant magnitude variable frequency current, the frequency being equal to the difference frequency between $f_{10}$ and $f_{11}$, and normally varies between 0 and 500 c.p.s. The speed of shaft 27 is then proportional to the difference frequency $f_{10} - f_{11}$, or is proportional to $2f_d/n$.

Figure 4:
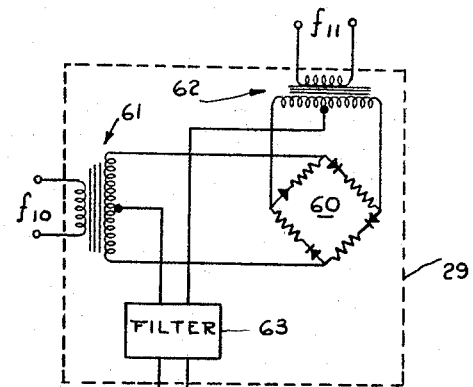
FIG. 4 is a diagram of a particular frequency subtraction device.

The frequency difference discriminator 29 may be of any desired type, a typical arrangement being shown in FIG. 4 which shows a ring type demodulator. A voltage of frequency $f_{10}$ is applied across one diameter of a rectifier bridge 60 through a transformer 61 and a second voltage having a frequency $f_{11}$ is applied across the other diameter of the rectifier bridge 60 through a transformer 62. The output of the demodulator, taken between center taps on the secondary windings of transformers 61 and 62, is a voltage containing components having frequencies $f_{10} - f_{11}$, $f_{10} + f_{11}$, $3f_{10} - f_{11}$, $3f_{10} + f_{11}$, etc. Since in the present invention, $f_{10} - f_{11}$ is a low frequency which may vary between 0 and 500 c.p.s. while $f_{10}$ and $f_{11}$ themselves are approximately 5000 c.p.s., the $f_{10} - f_{11}$ component can be easily separated from the output by a simple low pass filter 63.

In a sum frequency discriminator a basic ring type demodulator and filter cannot be used alone since the sum frequency component $f_{10} + f_{11}$ cannot be separated from $3f_{10} - f_{11}$ when $f_{10}$ and $f_{11}$ are nearly the same, and filtering of $f_{10} + f_{11}$ would be unsuccessful.

Figure 5:
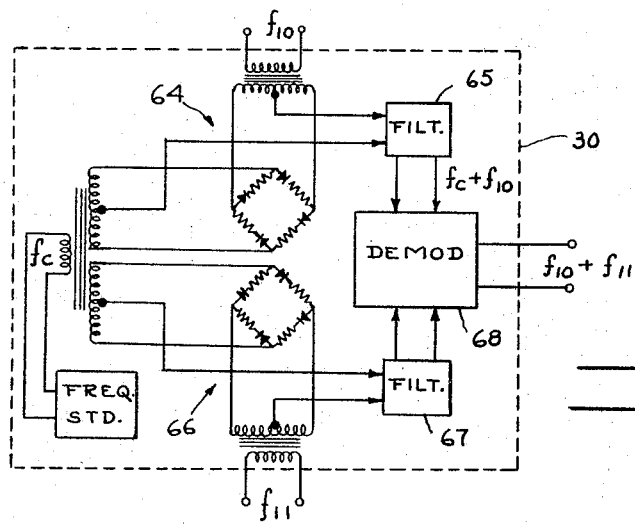
FIG. 5 is a diagram of a particular frequency summing device.

One scheme for obtaining the sum frequency is shown in FIG. 5. The voltage of frequency $f_{10}$ and a reference voltage of frequency $f_c$, which is very much higher than $f_{10}$, for example $f_c$ may be ten times as great as $f_{10}$, are applied to a demodulator 64 and the $(f_c + f_{10})$ component of its output voltage is obtained by a band-pass filter 65. This component can be successfully filtered out since the frequencies $f_c$ and $f_{10}$ are not nearly equal, and no voltage having a frequency equal to the sum frequency will be produced by a difference in the lower harmonics of $f_c$ and $f_{10}$.

The voltage of frequency $f_{11}$ and the reference voltage of frequency $f_c$ are applied to a second demodulator 66, the output of which is transmitted through filter 67 to separate the $f_c - f_{11}$ component. The outputs of the filters 65 and 67 are then applied to a third demodulator 68 to provide a voltage having a frequency $f_e$, equal to the difference in the input frequencies, or $$f_e = (f_c + f_{10}) - (f_c - f_{11}) = f_{10} + f_{11}$$

which is the sum of the orginal frequencies $f_{10}$ and $f_{11}$. Other types of frequency summing circuits may be employed if convenient, and the invention is not to be limited to the embodiment here described.

The output voltage of frequency summing means 30 and the output voltage of the reference voltage supply 31, having a constant amplitude and a frequency of $f_r$ are applied to the demodulator 32 which is adapted to produce an output voltage of constant amplitude and frequency equal to the difference between the input voltage frequencies or $f_r - (f_{10} + f_{11})$. Demodulator 32 may be of the same type as the difference demodulator 29.

Figure 6:
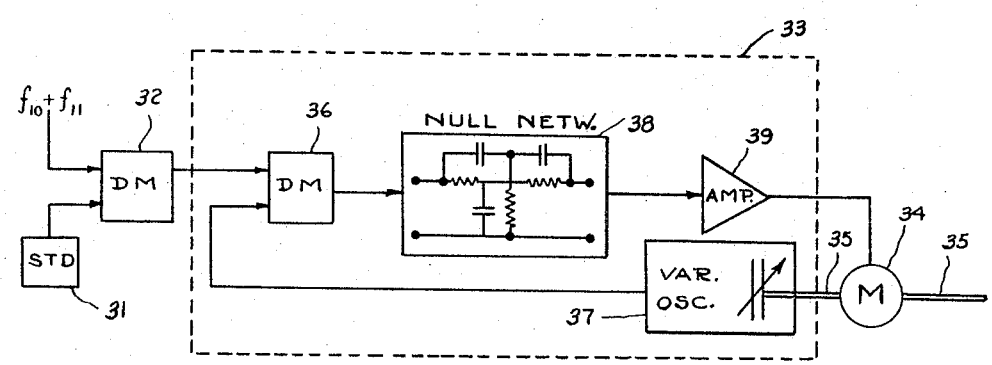
FIG. 6 is a diagram of a particular frequency bridge.

The difference frequency $f_r - (f_{10} + f_{11})$ is transformed into a shaft displacement by the frequency bridge 33 and motor 34. The frequency bridge 33 contains a variable element which is adjusted by the output shaft 35 of motor 34 until the output of the bridge 33 is zero and the position of the shaft 35 corresponds to the difference frequency $f_r - (f_{10} + f_{11})$. The frequency bridge 33 may be of the type shown in FIG. 6, for example.

Here, the demodulator 32 supplies the difference voltage $f_r - (f_{10} + f_{11})$ to a demodulator and filter 36 which is also supplied by a votlage of variable frequency from the variable oscillator 37, and which is adapted to produce a voltage having a frequency equal to the difference in the frequencies of the oscillator 37 and the demodulator 32 output voltages. The output of the demodulator-filter 36 is supplied to the null network 38 which has a characteristic such that the voltage output is zero at some pre-selected input frequency, and when the input frequency deviates therefrom the magnitude of the output voltage indicates the magnitude of the deviation and the phase of the output indicates the direction of the deviation. The network 38 may consist of a bridged T network, for example, having properly chosen components. It will be seen that if the oscillator 37 output frequency is very nearly the same as the frequency of the demodulator 32 output, then the output frequency of the demodulator 36 would be a low beat frequency of one or two cycles per second and unsatisfactory operation might result. For this reason, the oscillator 37 normally produces a voltage at some preselected frequency, for example 400 cycles per second greater than the nominal value of $f_r-(f_{10}+f_{11})$. The null circuit input or output is therefore a voltage having a frequency approximately equal to 400 cycles per second, and a magnitude proportional to the deviation of the input frequency from 400 c.p.s.

The motor 34 is energized by the output of null network 38 through amplifier 39 to drive shaft 35 to adjust a variable capacitor, for example, in the oscillator 37 and thereby to adjust the frequency of the oscillator output. When the oscillator output frequency is such that the null network input is exactly 400 cycles, the output of the null network is zero and motor 34 is deenergized. At this point the position of shaft 35 corresponds to the frequency of the signal output of the demodulator filter 32. It should be remembered that the above is merely one proposed embodiment of a frequency bridge which operates in the required manner but that many other types may be used if desired, and the invention is not to be limited to this embodiment.

Shaft 27 drives the disc 40 of a mechanical multiplier 41 of the ball-and-disc integrator type, the ball 42 of which is displaced along a radius of disc 40 by the shaft 35. The roller 43 of the multiplier 41 is therefore driven at a rate equal to the product of the speed of shaft 27 and the displacement of ball 42, or $$\frac{2f_d}{n}K[f_s-f_r] \quad (11)$$

where K is the constant of proportionality generated by the multiplier 41.

The rotation of shaft 27 is added to the rotation of roller 43 in the mechanical differential 44 to drive shaft 45 at a speed, $f_0{}^1$, equal to:

$$f_0{}^1=\frac{2f_d}{n}K[f_s-f_r]+\frac{2f_d}{n} \quad (12)$$

If now K is chosen equal to $1/f_r$ by proper selection of the mechanical elements of the multiplier 41 then Equation 12 reduces to Equation 13, which corresponds to that given earlier by Equation 10:

$$f_0{}^1=\frac{4ka}{nf_r} \quad (13)$$

Now, since the speed of shaft 45 is proportional to $ka$, or to the acceleration, the displacement of shaft 45 is proportional to the velocity. If the initial velocity of the craft is not zero, it may be added to the displacement of shaft 45 by the differential 46 to provide a true velocity indication at the output shaft 47 which may be read on dial 48.

From the foregoing explanation, the theoretical operation of the accelerometer will be clear. However, some of the physical requirements for the various elements which are necessary for making the accelerometer a practical instrument are discussed below.

In order to keep changes in the relative length of the two wires within acceptable limits the wires should have a low thermal coefficient of expansion and good thermal conductivity. The mechanical strength of the wire material should be high in order to be able to attain a relatively high natural frequency. A high modulus of elasticity means smaller displacements and shorter supporting wires and therefore smaller space requirements. A low resistivity wire has less power dissipation and is less likely to raise the temperature. All of these requirements and desirable characteristics are met by a number of materials such as beryllium-copper, tungsten or molybdenum, for example.

It has been found that for the expected range and accuracy it is advisable to mount the sensitive wire structure in an evacuated envelope in order to preclude the unknown effects of dirt and moisture.

In order to prevent the possibility of operating the wire in a non-linear region, the amplitude of its vibration must be controlled so as not to exceed some given value, which may be determined mathematically or by experimentation. It appears that the amplitude control is most satisfactorily accomplished through use of a non-linear network between the oscillator and the vibrating wire.

Although the described embodiment has specified wire for the vibrating members 10 and 11, it is evident that tapes or ribbons can be employed equally well. In fact, it has been found that the tapes have certain advantages over wire in the matter of decoupling and reliability. For example, wires are known to be anisotropic but tapes can be oriented into the operating position without difficulty. The tapes are caused to vibrate in planes perpendicular to each other to effect the decoupling mentioned above.

We claim:

1. In a device of the character described, a pair of spaced supports, a mass, a pair of coaxial tensioned wires extending between said mass and said supports, first electronic means for keeping one of said wires vibrating at its natural frequency and having an output signal alternating at said one natural frequency, second electronic means for keeping the other of said wires vibrating at its natural frequency and having an output signal alternating at said other natural frequency, means for determining the difference between said natural frequencies, means for determining the sum of said natural frequencies, means for multiplying an amount controlled by said sum by said difference to obtain a product, and means for adding said product to said difference to obtain an output indicative of the velocity of the supports in the axis of said wires.

2. In a device of the character described, a pair of spaced supports, a mass, a pair of coaxial tensioned wires extending between said mass and said supports, first electronic means for keeping one of said wires vibrating at its natural frequency and having an output signal alternating at said one natural frequency, second electronic means for keeping the other of said wires vibrating at its natural frequency and having an output signal alternating at said other natural frequency, means for determining the difference between said natural frequencies, said means comprising a synchronous motor having a pair of stator windings and a pair of rotor windings, electrical connections between the output of said first electronic means and said stator windings, electrical connections between the output of said second electronic means and said rotor windings, and phase splitting means interposed in said connections.

3. In a device of the character described, a pair of spaced supports, a mass, a pair of coaxial tensioned wires extending between said mass and said supports, first electronic means for keeping one of said wires vibrating at its natural frequency and having an output signal alternating at said one natural frequency, second electronic means for keeping the other of said wires vibrating at its natural frequency and having an output signal alternating at said other natural frequency, means for determining the difference between said natural frequencies, means for determining the sum of said natural frequencies, means for multiplying an amount controlled by said sum by said difference to obtain a product, and means for adding said product to said difference to obtain an output indicative of the velocity of the supports in the axis of said wires, said means for determining the sums of said natural frequencies comprising a pair of demodulator means, each supplied with a voltage of reference frequency and a voltage of one of said natural frequencies, filter means connected to the output of each of said demodulator means, third demodulator means supplied with outputs of said filters.

4. In a device of the character described, a pair of spaced supports, a mass, a pair of coaxial tensioned wires extending between said mass and said supports, first electronic means for keeping one of said wires vibrating at its natural frequency and having an output signal alternating at said one natural frequency, second electronic means for keeping the other of said wires vibrating at its natural frequency and having an output signal alternating at said other natural frequency, means for determining the difference between said nautral frequencies, means for determining the sum of said natural frequencies, means for multiplying an amount controlled by said sum by said difference to obtain a product, and means for adding said product to said difference to obtain an output indicative of the velocity of the supports in the axis of said wires, said means for multiplying an amount controlled by said sum by said difference to obtain a product comprising a disc displaced according to the difference between said natural frequencies, a ball displaced along said disc according to said amount, a roller driven by said ball, the displacement of said roller being proportional to said product.

5. In a device of the character described, a pair of spaced supports, a mass, a pair of coaxial tensioned wires extending between said mass and said supports, first electronic means for keeping one of said wires vibrating at its natural frequency and having an output signal alternating at said one natural frequency, second electronic means for keeping the other of said wires vibrating at its natural frequency and having an output signal alternating at said other natural frequency, means for determining the difference between said natural frequencies, means for determining the sum of said natural frequencies, means for multiplying an amount controlled by said sum by said difference to obtain a product, and means for adding said output to said difference to obtain an output indicative of the velocity of the supports in the axis of said wires, said means for determining the sums of said natural frequencies comprising a pair of demodulator means, each supplied with a voltage of reference frequency and a voltage of one of said natural frequencies, filter means connected to the output of each of said demodulator means, third demodulator means supplied with outputs of said filters, said means for multiplying amount controlled by said sum by said difference to obtain a product comprising a disc displaced according to the difference between said natural frequencies, a ball displaced along said disc according to said amount, a roller driven by said ball, the displacement of said roller being proportional to said product.

6. In a device of the character described, a pair of spaced supports, a mass, a pair of coaxial tensioned members extending between said mass and said supports, first electronic means for keeping one of said members vibrating at its natural frequency, second electronic means for keeping the other of said members vibrating at its natural frequency, means for determining the difference between said natural frequencies, said members comprising tapes of rectangular cross section attached to said mass so that their wide surfaces lie in perpendicular planes, said first and second electronic means being positioned to vibrate said tapes in the planes perpendicular to their surfaces.

7. In a device of the character described, a pair of spaced supports, a mass, a pair of coaxial tensioned members extending between said mass and said supports, first electronic means for keeping one of said members vibrating at its natural frequency, second electronic means for keeping the other of said members vibrating at its natural frequency, means for determining the difference between said natural frequencies, said mass comprising a pair of spaced weights connected by an elastic, non-rigid member aligned with said coaxial tensioned members, for decoupling said tension members.

References Cited

UNITED STATES PATENTS

| 1,995,305 | 3/1935 | Hayes | 264—1 |
| 2,591,921 | 4/1952 | Cosgriff et al. | 264—1 |
| 2,697,594 | 12/1954 | Stanton | 264—1 |
| 2,725,492 | 11/1955 | Allan | 264—1 |
| 2,762,221 | 9/1956 | Lundquist | 264—1 |

FOREIGN PATENTS 729,894  12/1942  Germany.

RICHARD C. QUEISSER, *Primary Examiner.*

SAMUEL BOYD, *Examiner.*

W. J. CURRAN, R. F. STAHL, JAMES J. GILL,
*Assistant Examiners.*

UNITED STATES PATENT OFFICE
CERTIFICATE OF CORRECTION

Patent No. 3,332,290            July 25, 1967

Charles D. Bock et al.

It is hereby certified that error appears in the above numbered patent requiring correction and that the said Letters Patent should read as corrected below.

Column 4, line 68, for "votlage" read -- voltage --; column 7, line 14, for "nautral" read -- natural --; line 40, for "output" read -- product --.

Signed and sealed this 18th day of June 1968.

(SEAL)
Attest:

Edward M. Fletcher, Jr.

Attesting Officer

EDWARD J. BRENNER

Commissioner of Patents